(12) United States Patent
Busch et al.

(10) Patent No.: US 7,747,869 B2
(45) Date of Patent: Jun. 29, 2010

(54) PROCESS FOR DETECTING DEFECTIVE COMPONENT EXCHANGES

(75) Inventors: Michael-Rainer Busch, Ebersbach (DE); Andreas Miksch, Stuttgart (DE)

(73) Assignee: Daimler AG, Stuttgart (DE)

( * ) Notice: Subject to any disclaimer, the term of this patent is extended or adjusted under 35 U.S.C. 154(b) by 1212 days.

(21) Appl. No.: 10/981,607

(22) Filed: Nov. 5, 2004

(65) Prior Publication Data

US 2005/0125655 A1 Jun. 9, 2005

(30) Foreign Application Priority Data

Nov. 7, 2003 (DE) ................. 103 52 071

(51) Int. Cl.
G06F 21/00 (2006.01)
G06F 7/04 (2006.01)
G06F 12/14 (2006.01)
H04L 9/32 (2006.01)

(52) U.S. Cl. ............. 713/185; 713/176; 713/179; 380/28; 380/44; 380/46; 726/18; 726/19

(58) Field of Classification Search ............. 713/185; 380/28, 44, 46
See application file for complete search history.

(56) References Cited

U.S. PATENT DOCUMENTS

| | | | | |
|---|---|---|---|---|
| 4,652,990 A | * | 3/1987 | Pailen et al. | 705/56 |
| 4,720,859 A | * | 1/1988 | Aaro et al. | 713/169 |
| 4,800,590 A | * | 1/1989 | Vaughan | 713/184 |
| 5,091,942 A | * | 2/1992 | Dent | 380/46 |
| 5,619,573 A | * | 4/1997 | Brinkmeyer et al. | 713/170 |

(Continued)

FOREIGN PATENT DOCUMENTS

DE 102 09 766 A1 10/2003

(Continued)

OTHER PUBLICATIONS

Williamson, F.R.; Moore, L.F.; Brooks, R.; Williamson, J.A. and McGee, M.C. "A Coded Radar Reflector for Remote Identification of Personnel and Vehicles". IEEE National Radar Conference. Pub. Date: 1993. Relevant pp. 186-191. Found on the World Wide Web at: http://ieeexplore.ieee.org/stamp/stamp.jsp?tg=&arnumber=270468.*

(Continued)

*Primary Examiner*—William R Korzuch
*Assistant Examiner*—Jeremiah Avery
(74) *Attorney, Agent, or Firm*—Crowell & Moring LLP

(57) ABSTRACT

Method of detecting an unauthorized exchange of components in the case of a technical system, where the control unit (1) sends an encoded message (3) to a component (2) to be checked, in a data field of the message (3) a randomly generated or not easily reproducible value (5, 6) being entered, which is used for checking the installed component (2). The component (2) accesses an assignment field (8) and, as a result, assigns an identification (9) to each not easily reproducible or random value (5, 6) transmitted together with the message (3), and the component (2) transmits the identification corresponding to the value (5, 6) back to the control unit (1). The control unit (1) decides on the basis of the identification (9) whether the component (2) is that the component (2) which is authorized for use in the particular technical system.

7 Claims, 1 Drawing Sheet

U.S. PATENT DOCUMENTS

| | | | | |
|---|---|---|---|---|
| 5,675,490 | A * | 10/1997 | Bachhuber | 701/32 |
| 5,708,308 | A * | 1/1998 | Katayama et al. | 307/10.5 |
| 5,796,178 | A * | 8/1998 | Onuma | 307/10.2 |
| 6,263,437 | B1 * | 7/2001 | Liao et al. | 713/169 |
| 6,701,231 | B1 * | 3/2004 | Borugian | 701/30 |
| 6,987,853 | B2 * | 1/2006 | Uner | 380/44 |
| 7,000,115 | B2 * | 2/2006 | Lewis et al. | 713/176 |
| 7,036,013 | B2 * | 4/2006 | Renganarayanan et al. | 713/178 |
| 7,043,453 | B2 * | 5/2006 | Stefik et al. | 705/52 |
| 7,069,437 | B2 * | 6/2006 | Williams | 713/166 |
| 7,119,696 | B2 * | 10/2006 | Borugian | 340/576 |
| 7,120,696 | B1 * | 10/2006 | Au et al. | 709/229 |
| 7,149,308 | B1 * | 12/2006 | Fruehauf et al. | 380/44 |
| 2002/0196094 | A1 * | 12/2002 | Skinner et al. | 333/12 |
| 2003/0193398 | A1 | 10/2003 | Geber et al. | |
| 2003/0196094 | A1 * | 10/2003 | Hillis et al. | 713/179 |

FOREIGN PATENT DOCUMENTS

DE     103 48 086 A1     3/2005

OTHER PUBLICATIONS

Germany Search Report dated Aug. 11, 2006 including English translation of pertinent portion (Nine (9) pages).

* cited by examiner

PROCESS FOR DETECTING DEFECTIVE COMPONENT EXCHANGES

This Application claims priority to German Application DE 10352071.6 filed on Nov. 7, 2003, the entire disclosure of which is incorporated herein by reference.

BACKGROUND AND SUMMARY OF THE INVENTION

The invention relates to a method of detecting an unauthorized exchange of components in a technical system, particularly a transport device, where the control unit sends an encoded message to a component to be checked, a randomly generated or not easily reproducible value being entered in a data field of the message, which is used for checking the installed component.

Such a method can, for example, be used in the case of motor vehicle radiators which provide a special catalytic method for converting harmful substances into environmentally compatible substances. In particular when a tax reduction is granted by the government, it is necessary to ensure that this special catalytic motor vehicle radiator had originally been installed in the transport device and will later also remain installed. A catalytic motor vehicle radiator to which the inventive method can be applied is known from German Patent Document DE 103 40 086 A1. However, the method of detecting an unauthorized exchange of components can also be used together with all other conceivable components in the case of a transport device or a machine tool.

It is an object of the present invention to further develop a method of detecting an unauthorized exchange of components such that an unauthorized exchange of components is made difficult. The method according to the invention is to be suitable particularly for an official authorization of tax-privileged systems in connection with environmental production measures by using special components.

Accordingly, the component accesses an assignment field and, as a result, assigns an identification to each random or not easily reproducible value transmitted with the message. The component transmits the identification corresponding to the value back to the control unit, so that, as a result of the identification, the control unit can decide whether the component is a component permitted to be used by this technical system.

In the case of the method according to the invention, a control unit sends a first message to the component to be checked and checks the message returning from the component as to whether the requested response is present. The exchange of messages has to take place in such a manner that malicious imitators cannot simply copy the message exchange process. It is therefore necessary for a value which is difficult to reproduce or is randomly generated to be sent with the message from the control unit. An assignment field is accessed in the component and an identification is assigned to the value. This identification is returned by the component to the control unit and can then be analyzed in the control unit. If, for example, an assignment field is filed in the control unit, which corresponds to the assignment field accessed by the component, the control unit, by using the not easily reproducible or random value, can access its own assignment field and, as a result, then has to receive the same identification as the one transmitted with the message by the component. The value can, for example, be generated in the control unit by means of a random event generator or, as a not easily reproducible value, can be created in that the control unit accesses a sensor signal which relates to, for example, the combustion chamber pressure, the rotational engine speed or rolling or pitching values of the vehicle. For example, when the control unit accesses the result value of a sensor, this result reflects a physical quantity which over the time has no easily representable, mathematical functional interrelationship. The control unit then reads in the sensor value, normalizes the latter, for example, to a value between 0 and 1, and then sends the value together with the message to the component. The returned identification can then be comprehended in the control unit in that an assignment field is compared within the control unit. On the other hand, it can also be provided that the component sends back a second encoded message to the control unit, in which case another identification contained therein, on the basis of a predetermined computation, will then again result in the value which is difficult to reproduce.

The assignment field preferably is a matrix, and the identification is determined on the basis of two values which are difficult to reproduce or of two randomly generated values which are transmitted with the message from the control unit to the sensor. The message from the control unit will then have two values, so that an unambiguous position can be determined within the matrix-shaped assignment field. The matrix is occupied with predetermined identifications in all positions, so that, by way of the two transmitted and random values, a different identification is obtained each time.

In a further development of the invention, a selection data field is provided within the message transmitted from the control unit to the component, for example, a sensor. The authorization check will then only be carried out by means of an access to the assignment field if a defined value is transmitted in the selection data field. If the defined value is not listed in the selection data field, the identification is generated not by way of the assignment field but, for example, by way of a mathematical algorithm. This mathematical algorithm is filed in the component and is implemented by using the two transmitted random values. This computation algorithm can be filed in the component as well as in the control unit. Thus, when the control unit inputs a certain value in the selection data field, the identification is generated on the basis of the matrix-type assignment field, but if the value deviates in the selection data field, the returned identification is generated by way of an algorithm which is then also present in the control unit for the checking.

As a result of this encoding system, a third party cannot determine mathematical interrelationships between the transmitted identifications by monitoring the bus messages, because the identifications cannot be mathematically determined by a linear exponential function or a power function. A decoding of the method is therefore extremely difficult, and it is almost impossible to log in an unauthorized component at the control unit.

In one embodiment, the process can take place as follows: At a cold start of the engine of a transport device, a message is sent at repeated time intervals by way of the databus to a temperature sensor, and two randomly defined values and a selection data field are provided in this message. An electronic circuit within the temperature sensor analyzes the message and, within a matrix-type assignment field, determines an identification on the basis of the two randomly determined values, if, for example, the value 39 or 79 is listed in the identification data field. At all other permissible values, an algorithm is used for computing the identification from the two randomly defined values. Then, the temperature sensor sends a message back to the control unit and transmits at least the identification and possibly also the selection data field.

In the simplest case, in the knowledge of the assignment field and of the algorithm and based on the known randomly defined values, it can be checked in the engine control unit whether the temperature sensor has an authorization for use in the transport device. If, for safety reasons, no matrix-type assignment field is filed within the control unit, the possibility exists that an additional message with another encoding is sent back by the temperature sensor, in which case the identification is then computed back by way of an algorithm in the control unit, so that the control unit then compares the identification of the first message with the computed-back identification from the second message. If the two identifications correspond to one another, the component, that is, the temperature sensor is authorized to be used for the particular transport device.

The computation of the identification is required to take place, for example, for the values 39 and 79 by way of an inverse matrix or an inverse function, and for the other values, relative to the selection data field, by way of an inverse function or a corresponding algorithm. If, in their results, the identifications of the first and the second message differ from one another, the permitted temperature sensor or the permitted component is not installed in the transport device and a fault signal is generated which can be indicated in the vehicle or can be recognized in the diagnostic system.

In a further development of the invention, on the basis of a function value or a function result sent back by the component by means of a message, a comparison is carried out in the control unit with the identification transmitted during a preceding message exchange and it is decided therefrom whether the component is that component which is permitted for the use in the transport device.

Different possibilities exist for further developing the teaching of the present invention in an advantageous manner.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
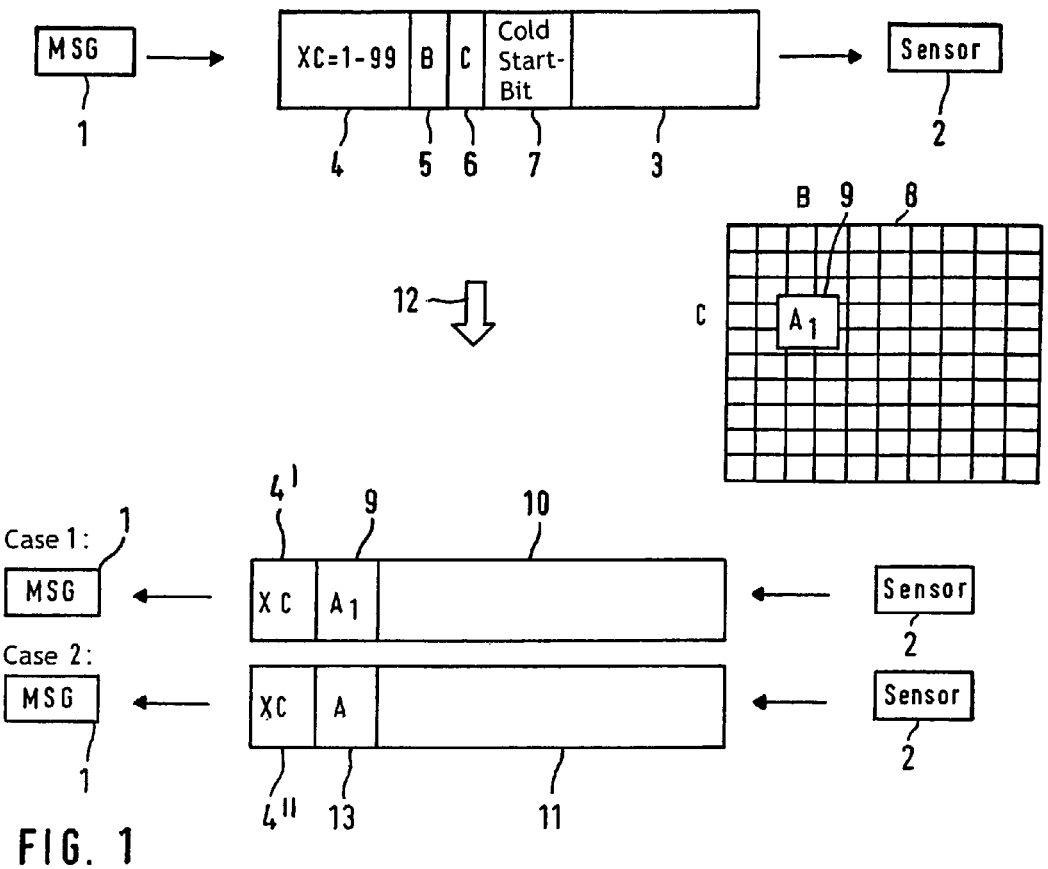
FIG. 1 is a schematic view of the implementation of the method of detecting an unauthorized exchange of components according to the invention as a first alternative.

The method of detecting an unauthorized exchange of components in the case of an automobile is suitable for the automatic checking of a tax privilege in the case of environmentally compatible components. In this case, an engine control unit (MSG) 1 checks the authorization of an intelligent temperature sensor 2 for the installation into the concerned automobile. However, in addition to the temperature sensor 2, any other component can also be checked with respect to its authorized installation. It can, for example, be provided that certain components are recognized as environmentally compatible, and if their secure installation in the automobile is proven, the vehicle will be tax-privileged. By the method of detecting an unauthorized exchange of components, it is therefore determined whether the sensor 2 is still the originally provided tax-privileged sensor 2. The method according to the invention is encoded in such a manner that the method cannot be influenced by an unauthorized third party such that a non-authorized sensor 2 can be installed.

At certain time intervals, the control unit 1 sends an encoded message 3 by way of an electric line or a databus between the control unit 1 and the sensor 2. The message 3 has a selection data field 4 and two data fields for values which are difficult to reproduce or random values 5, 6. A cold start bit 7 indicates a cold start of the engine, at which the engine control unit 1 in every case checks the authorization of the sensor 2 for the installation inside the automobile. When the cold start bit 7 is not set, a check does not have to take place or an authorization check of a different type can be carried out.

The value 5, 6 which is difficult to reproduce or random can be generated in the engine control unit 1 by means of a random generator or by means of the use of physical sensor signals which experience a varying change which is difficult to detect mathematically. For example, rotational speed values or exhaust gas values, which depend on the driver's driving manner, can be used as values 5, 6 which are difficult to reproduce. In every case, the engine control unit 1 also stores the values 5, 6 back. If the selection data field 4 assumes a value which is known and predefined in the engine control unit 1, an identification 9 is determined by means of the transmitted values 5, 6 within the matrix 8. In this case, the matrix 8 represents an assignment field, and by means of a special normalization, a column number and a line number 10 are determined from the random values 5 and 6, so that the identification 9 can be determined within the matrix 8. The sensor 2 responds to the inquiring message 3 of the engine control unit 1 in that either a type 10 message or a type 11 message is sent back to the control unit 1. The time arrow 12 shows the time sequence for the schematic representation. In a first case, when the selection data field assumes a certain value, the sensor 2 sends the message 10 back to the control unit 1. The determined value is then entered in the selection data field 4' and the identification 9 is also transmitted along to the control unit 1 in the data field which follows.

In the second case, when the selection data field 4' assumes a deviating value, a value 13 computed by a function or means of an algorithm is also transmitted along to the control unit 1. In this first alternative, the assignment field has to be present in the control unit 1 as well as in the sensor, so that, in the first case, the engine control unit 1 can determine whether the identification computed within the engine control unit 1 corresponds to the identification transmitted back by the sensor 2. In the other case 2, as a result of the computation of the known algorithm by means of the random values 5 and 6, the engine control unit 1 has to arrive at the same identification as the value 13 which is sent back by the sensor 2 with the message 11 to the control unit 1. If the two identifications, specifically the identification computed by the control unit 1 and the identification computed by the sensor 2 correspond to one another, the authorized component 2 is installed. If the two identifications do not correspond to one another, it is a defective or non-authorized component. This result is then indicated in the automobile possibly in a diagnosis or by means of a warning display.

Figure 2:
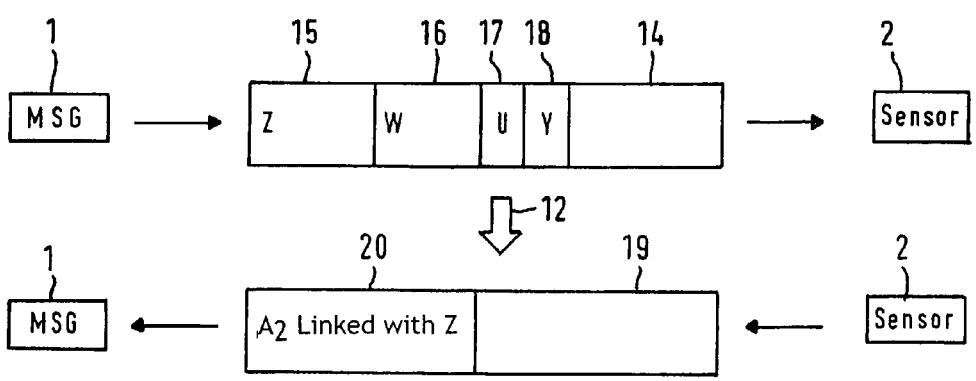
FIG. 2 is a schematic view of the implementation of the method of detecting an unauthorized exchange of components when sending a second message by the component according to an expanded alternative.

FIG. 2 illustrates an expanded embodiment of the method according to the invention, in which the assignment field 8 does not have to be known in the control unit 1. For reasons of safety, this may be required in order to prevent a copying of falsification of the method by third persons. By means of this alternative method, in addition to the above-described message, an additional message is also sent from the engine control unit 1 to the sensor 2. This message 14 has a changed computation process. For example, a randomly determined number 15, a value 16 for differentiating several functions and two additional, randomly determined values 17 and 18 may be transmitted. A family of functions, which can each be differentiated from one another by the value 16, is filed in the engine control unit 1 and in the sensor 2. For example, the value 1 may correspond to a logarithmic function, and the value 2 may correspond to an exponential function. On the basis of the number transmitted with the value 16, the sensor 2 will select a function from the family of functions and, by means of the values 17 and 18, will generate a function result, which is the identification $A_2$. The identification $A_2$ is linked to the random number 15 and, together with the message 19 within the data field 20, is transmitted back to the engine control unit 1.

By means of the known values 15, 16, 17, 18, the identification $A_2$, linked with Z, is also determined in the engine control unit and both identifications, specifically the identification computed in the engine control unit 1 and the identification 20 transmitted back by the sensor 2, are compared. If the two identifications correspond to one another, it is recognized according to the method of the invention whether the authorized component is installed in the automobile. In the case of this expanded method, it is important that the identification $A_2$ is set up such that, when the same random numbers 17, 18 or 5, 6 are transmitted by the second method, the same identification $A_2$ as the identification $A_1$ is obtained, so that, in the engine control unit, in the case of the defined selection data field, which causes the computation by way of the matrix, together with the first message, the identification $A_1$ according to the first case in FIG. 1 and, together with the second message, the identification $A_2$ is transmitted back, and the identification $A_1$ corresponds to the identification $A_2$. In this manner, it is not required that the assignment field is also filed in the control unit 1. The function field, by means of which the identification $A_2$ is determined, has to be adapted to the matrix according to an encoding method. In this fashion, after the sending-back, the identification $A_1$ and the identification $A_2$ result in the same value in the engine control unit 1 if the authorized component 2 is installed in the transport device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of detecting an unauthorized exchange of components comprising the steps of:
   a control unit sending a message to a first component, said message including at least one randomly generated or not easily reproducible value used for checking said first component and a selection data field;
   said first component accessing an assignment field and assigning an identification to each of said at least one randomly generated or not easily reproducible value when a defined value is transmitted in the selection data field;
   said first component generating the identification on the basis of an algorithm when other values are transmitted in the selection data field;
   said first component transmitting said identification back to said control unit; and
   said control unit deciding, on the basis of the identification, whether the first component is a component which is authorized for use.

2. The method according to claim 1, wherein
   the assignment field is a matrix from which said identification is generated on the basis of two randomly generated or not easily reproducible values.

3. The method according to claim 1, wherein:
   the algorithm is filed in both the component and the control unit; and
   said control unit uses said algorithm to determine whether the component is authorized.

4. The method according to claim 1, wherein the first component sends back a message to the control unit, in which the selection data field and then the determined identification are transmitted.

5. The method according to claim 1, wherein, on the basis of a function value or function result sent back by the first component using a message, the control unit carries out a comparison with the identification forwarded during a preceding message exchange, and decides therefrom whether the first component is that component which is authorized for the use in this technical system.

6. The method according to claim 1, wherein, on the basis of a message transmission from the control unit, the first component sends back the corresponding message with the identification.

7. The method according to claim 1, wherein:
   the assignment field is also stored in the control unit;
   the control unit uses the at least one randomly generated or not easily reproducible value to generate an identification which corresponds to the identification transmitted by said first component; and
   said control unit determines whether said first component is authorized for use based on a comparison of said identifications.

* * * * *